United States Patent [19]
Koyama

[11] Patent Number: 5,222,147
[45] Date of Patent: Jun. 22, 1993

[54] SPEECH RECOGNITION LSI SYSTEM INCLUDING RECORDING/REPRODUCTION DEVICE

[75] Inventor: Motoaki Koyama, Yokohama, Japan

[73] Assignee: Kabushiki Kaisha Toshiba, Kawasaki, Japan

[21] Appl. No.: 953,777

[22] Filed: Sep. 30, 1992

Related U.S. Application Data

[63] Continuation of Ser. No. 507,773, Apr. 12, 1990, abandoned.

[30] Foreign Application Priority Data

Apr. 13, 1989 [JP] Japan ................... 1-93604

[51] Int. Cl.⁵ .......................................... G10L 5/00
[52] U.S. Cl. .................................... 381/43; 381/46
[58] Field of Search ......................... 381/41–46; 395/2

[56] References Cited

U.S. PATENT DOCUMENTS

| | | | |
|---|---|---|---|
| 3,582,559 | 6/1971 | Hitchcock et al. | 179/1513 |
| 4,759,068 | 7/1988 | Bahl | 381/43 |
| 4,831,653 | 5/1989 | Katayama | 381/43 |
| 4,833,713 | 5/1989 | Muroi et al. | 381/43 |

FOREIGN PATENT DOCUMENTS

0077194A1 4/1983 European Pat. Off.
0178509A1 4/1986 European Pat. Off.
974850 11/1964 United Kingdom.

Primary Examiner—Eanuel S. Kemeny
Attorney, Agent, or Firm—Finnegan, Henderson, Farabow, Garrett, Dunner

[57] ABSTRACT

A speech recognition LSI system comprises a speech segment detector for detecting a speech segment from a speech segment detected, a reference pattern memory for storing reference patterns, and a speech recognition section for comparing the speech segment detected by the detector with the reference patterns stored in the reference pattern memory and selecting the reference pattern most similar to that of the speech segment. The system further comprises a recording/reproduction device for recording the speech signal and for reproducing only the speech segment the speech segment detector has detected, so that an operator can hear the speech segment.

11 Claims, 11 Drawing Sheets

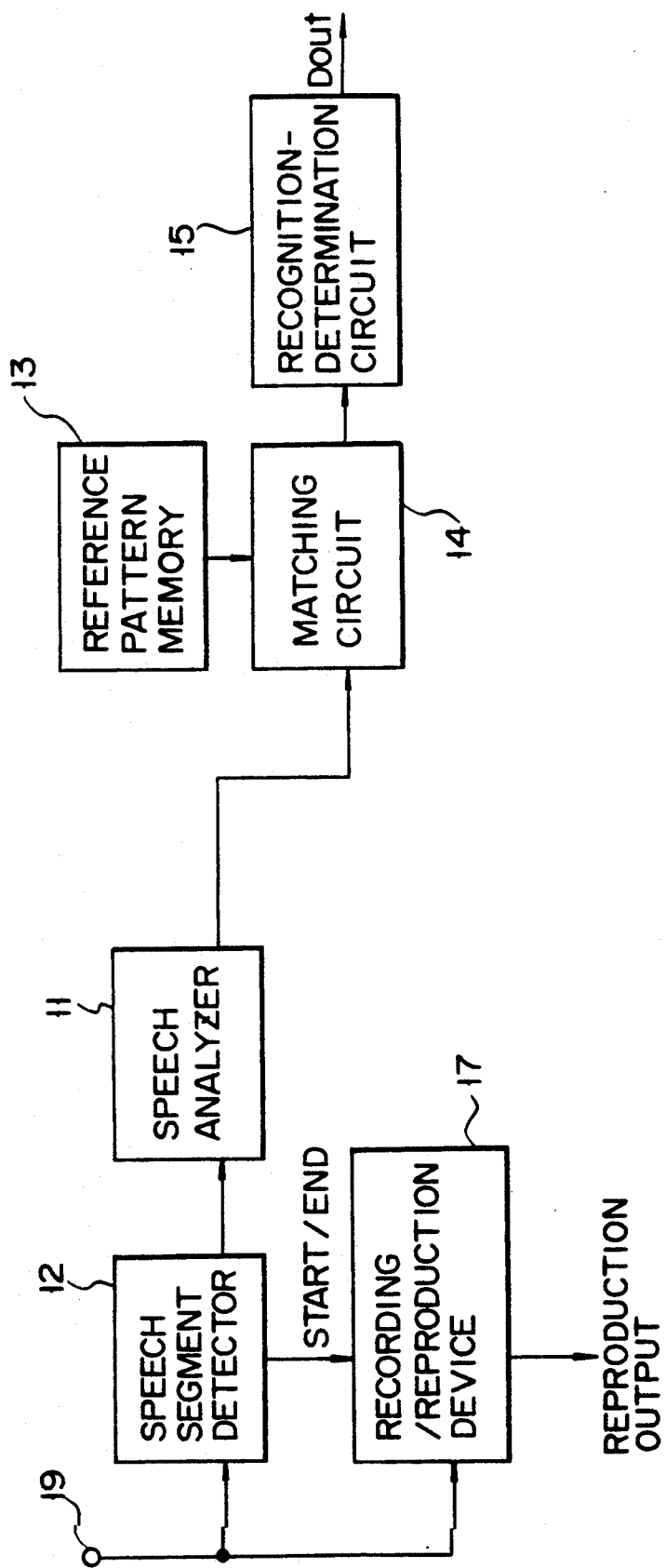
F I G. 6

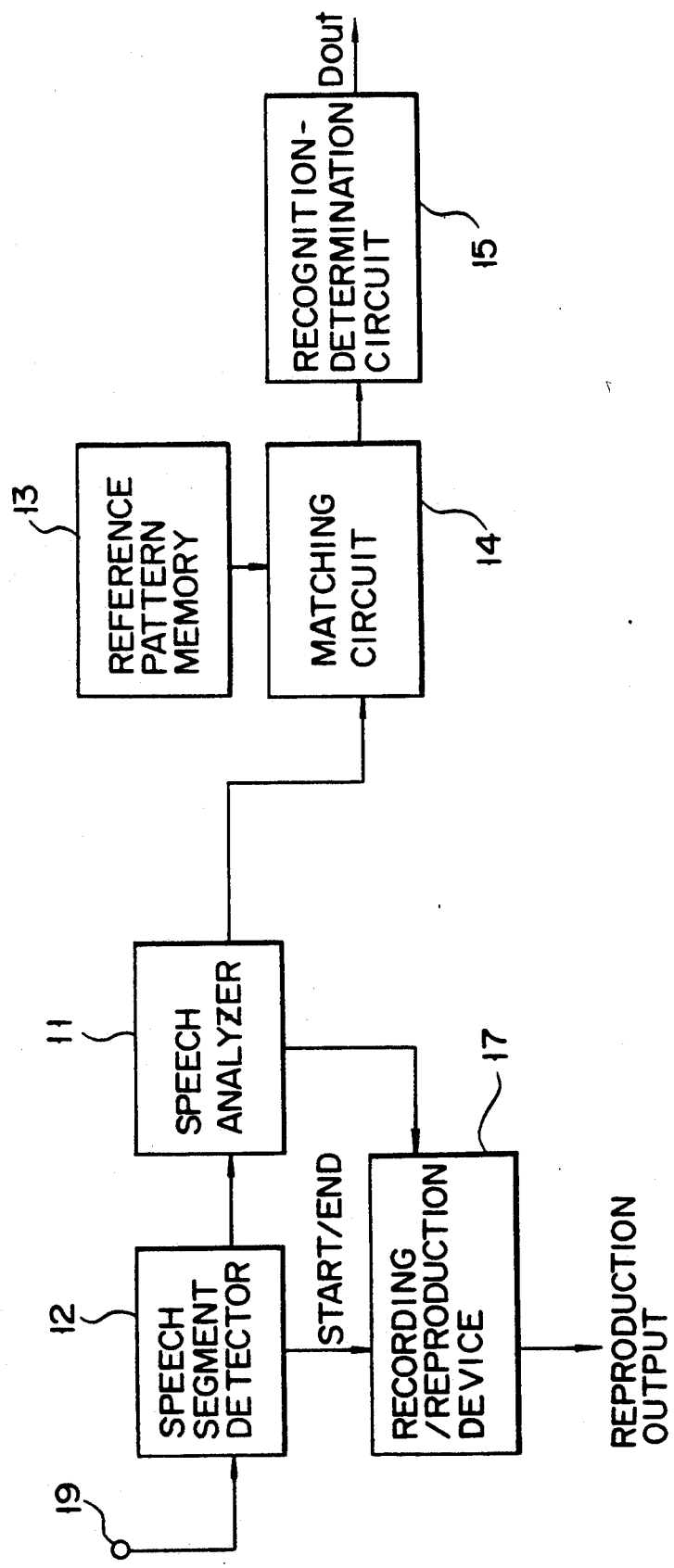
F I G. 8

SPEECH RECOGNITION LSI SYSTEM INCLUDING RECORDING/REPRODUCTION DEVICE

This application is a continuation of application Ser. No. 07/507,773 filed Apr. 12, 1990, now abandoned.

BACKGROUND OF THE INVENTION

1. Field of the Invention

The present invention relates to a speech recognition LSI system and, more particularly, to a speech recognition LSI system which can inform an operator of a detection error occurring in a given speech segment.

2. Description of the Related Art

A speech recognition system includes an A-D converer, a speech analyzer, a speech segment detector, a matching circuit, and a speech recognition circuit. The A-D converter converts a speech signal to a digital signal in accordance with the frequency band of the speech signal. The digital signal is input to the speech analyzer, which outputs time-sequential data of the respective frequency band. The data is input to the speech segment detector. The detector detects a speech segment from that time-sequential data. The speech segment, detected by the speech segment detector, is supplied to the matching circuit. The matching circuit compares the speech segment with a large number of registered reference patterns, determines the similarities between the speech segment and the reference pattern data items, and outputs signals representing the similarities. The signals, output by the matching circuit, are supplied to the speech recognition circuit. This circuit processes these signals and outputs a data item representing the reference pattern most similar to the speech segment, as "recognized" data.

However, in the above-described speech recognition system thus arranged, whether or not speech recognition processing is correctly performed depends on whether or not the speech segment is correctly detected. A conventional speech segment detector detects, as a speech segment, any segment of time-sequential data that remains at a level equal to or higher than a reference level for a period longer than a predetermined period. Hence, the detector cannot detect a segment of the time-sequential data, which is either at too low of a level or which lasts for too short a time period, as a speech segment. Assume an operator utters the word "KITCHEN," such that the first syllable "KI" is too feeble, and the second syllable "TCHEN" is strong enough. In this case, those segments of the data which correspond to "KI" and "TCHEN" are respectively at a level below, and a level above, the reference level. The detector cannot detect "KI" as a speech segment, and thus only detects "TCHEN" as a speech segment. The matching circuit, therefore, compares only the speech segment corresponding to "TCHEN", with the reference patterns. The speech recognition circuit will inevitably recognize the reference pattern data item more similar to "TCHEN" than any other pattern data item, as one which represents the word "KITCHEN."

When the operator notices this recognition error, he or she needs to utter the same word "KITCHEN" again. However, he or she cannot know why the first uttered "KITCHEN" has not been recognized, and utters the word again, in the same way as previously. Consequently, the speech segment detector detects the speech segment corresponding to "TCHEN" but not the speech segment corresponding to "KI". Therefore, the operator cannot help but repeat the word "KITCHEN" until the system recognize this word. Thus, the conventional speech recognition system has insufficient efficiency.

SUMMARY OF THE INVENTION

It is accordingly the object of the present invention to provide a speech recognition LSI system which can indicate to an operator a detection error in any given speech segment.

According to the present invention, there is provided a speech recognition LSI system comprising:

a speech segment detecting unit for detecting a speech segment from a speech signal;

reference pattern memory for storing reference patterns;

speech recognition unit for comparing the speech segment detected by the speech segment detecting unit with the reference patterns stored in the reference pattern memory, and for selecting the reference pattern most similar to the pattern of the speech segment detected by the speech segment detecting unit; and recording/reproduction unit for recording the speech signal and reproducing only the speech segment detected by the speech segment detecting unit, under the control of the speech segment detecting unit.

In the speech recognition LSI system, the recording/reproduction unit records a speech signal and reproduces only the speech segment which the detecting unit has detected from the speech signal. Hence, an operator can understand which word has been recognized correctly, and which word has been recognized incorrectly. Then, he or she can utter any incorrectly recognized word again, this time loud and distinctly enough so that the detector detects all speech segments forming the word, and the speech recognition unit recognizes the word correctly. Hence, the operator need not repeat an unrecognized word many times. Nor does the recognition unit need to perform its function many times to recognize each word the operator utters. The speech recognition LSI system can therefore recognize speech with high efficiency.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a block diagram showing a speech recognition LSI system according to a second embodiment of the present invention;

FIG. 8 is a block diagram showing a speech recognition LSI system according to a fourth embodiment of the present invention;

DETAILED DESCRIPTION OF THE PREFERRED EMBODIMENTS

Figure 1:
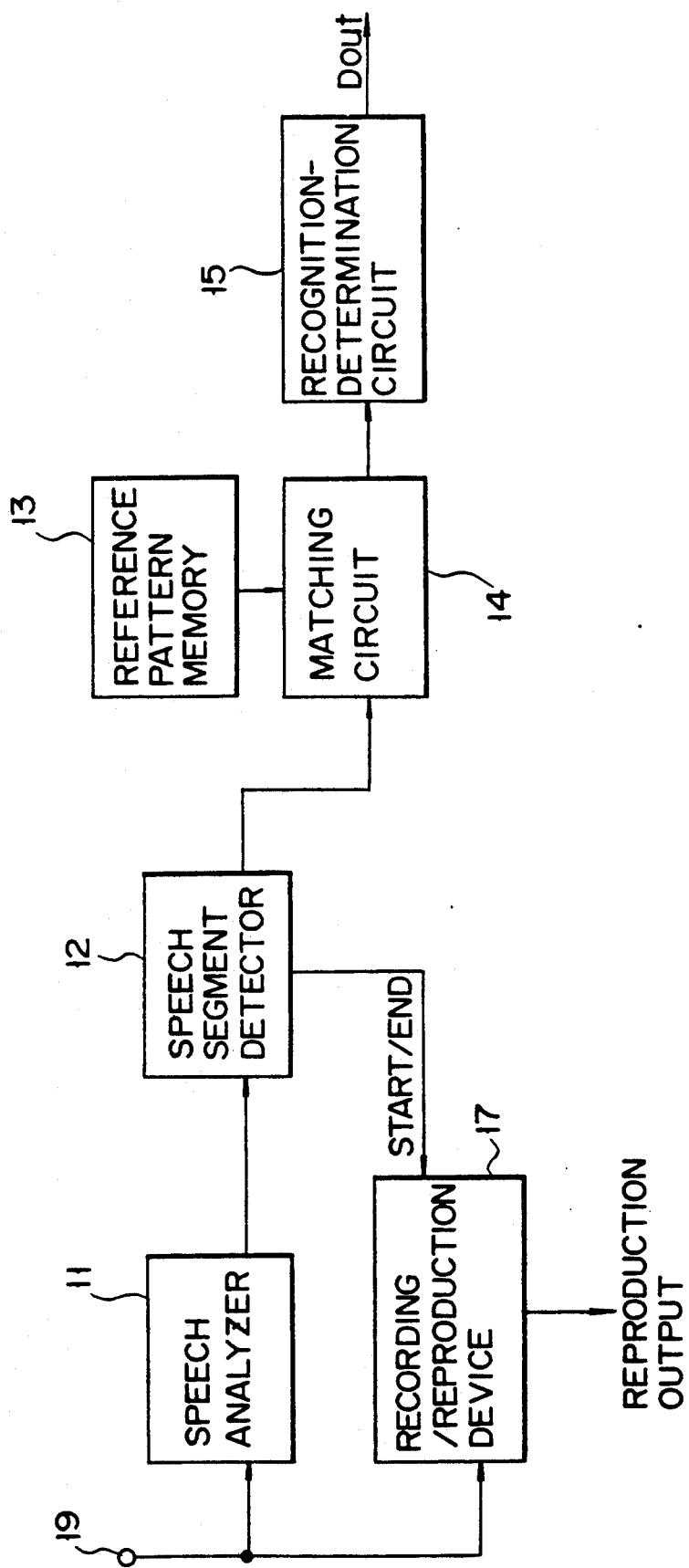
FIG. 1 is a block diagram showing a speech recognition LSI system according to a first embodiment of the present invention.

A speech recognition LSI system according to a first embodiment of the present invention will be explained below, with reference to FIG. 1.

The speech recognition LSI system comprises a speech analyzer 11, a speech segment detector 12, a reference pattern memory 13, a matching circuit 14, a recognition determination circuit 15, and a recording-/reproduction device 17.

Speech uttered by an operator is converted to an analog speech signal by a microphone. The signal is amplified by an amplifying device and is supplied to an input terminal 19. The analog signal is supplied from the input terminal 19 to the speech analyzer 11, which separates the signal into six different frequency bands, performs analog-to-digital conversion with respect to each frequency band and delivers speech data for the respective frequency channels. The speech analyzer 11 also converts the analog speech signal directly to digital energy channel data which covers all frequency bands of the speech signal. Thus, the analyzer 11 supplies seven items of data to the speech segment detector 12, one for an energy channel, and six for six frequency channels.

The speech segment detector 12 detects a speech segment from the speech data supplied from the speech analyzer 11 and supplies the speech segment to the matching circuit 14. The principle of detecting a speech segment by means of the speech segment detector 12 will be explained with reference to FIG. 2.

The speech segment detector 12 selects, as a candidate start point of a speech segment, a point in time when the data level of the energy channel exceeds a value X and determines the candidate start point as the true start point of the speech segment when the data level increases above the value X from the selected point of candidate start points over a continuous length of time exceeding a period Z, while cancelling a candidate start point when the data level decreases below the value X from that selected point of candidate start points within a time period not exceeding the length of period Z. The speech segment detector 12 selects, as the candidate end point of a speech segment, a point in time when the data level of the energy channel decreases below a value Y and determines that candidate end point as the true end point of the speech segment when the data level decreases from the selected, point of candidate end points over a length of time exceeding a period V, while cancelling that candidate end point when the data level increases above the value Y before the time period V is passed from the selected point of candidate end points.

Figure 2:
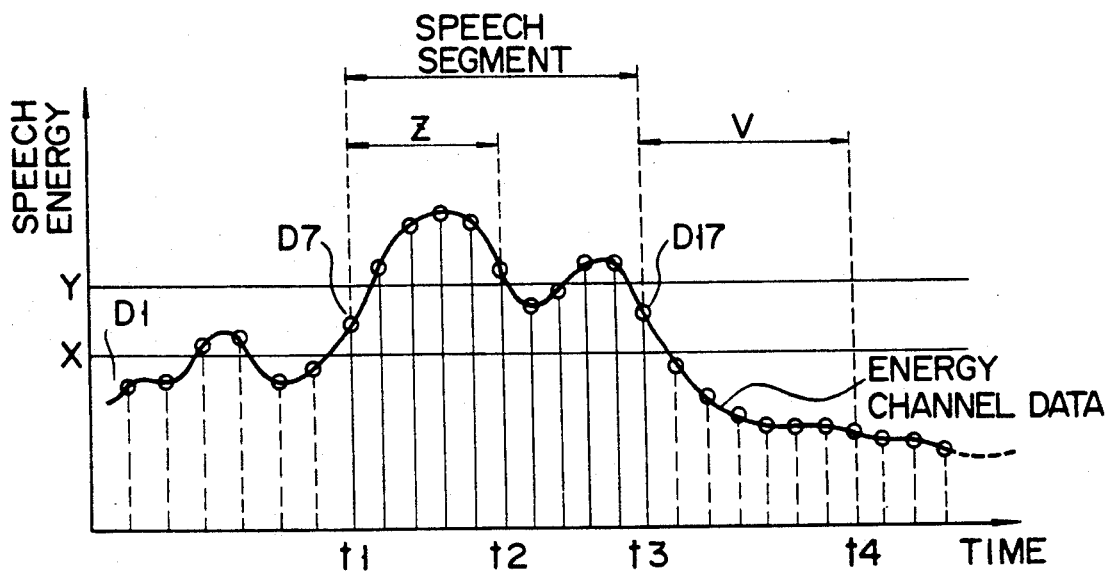
FIG. 2 is a graph for explaining the detection operation principle of the speech segment detector used in the speech recognition LSI system shown in FIG. 1.

In FIG. 2, the data level continuously exceeds the value X over the period Z extending from a time t1 when the data level of the energy channel exceeds the value X to a time t2 when the time period Z is passed. For this reason, the time t1 is determined as the start point of the speech segment. Since the data level is continuously kept below the value Y over a time period extending from a time t3 when the data level decreases from the value Y to a time t4 when the time period V is passed, the time t3 is determined as the end point of the speech segment.

In this way, the speech segment detector 12 (FIG. 1) detects a speech segment based on the data level of the energy channel. Speech data of six frequency channels pertaining to the detected speech segment is supplied to the matching circuit 14.

Reference patterns corresponding to many words are initially registered in the reference pattern memory 13 shown in FIG. 1. For one word, six reference patterns are prepared which correspond to six frequency channels. The matching circuit 14 compares, for every frequency channel, the speech data derived from the speech segment detector 12 and respective reference patterns registered in the reference pattern memory 13 and calculates a similarity level for each of the six channels. A comparing operation of the speech data is sequentialy performed against all the reference patterns which have been registered in the reference pattern memory 13.

The recognition determining circuit 15 selects a reference pattern to be output as recognition result data Dout, on the basis of the mean similarity for the channels of the respective reference patterns which are calculated by the matching circuit 14. Of those reference patterns which are registered in the reference pattern memory 13, a reference pattern with the highest similarity is selected as the recognition result data Dout.

The recording/reproduction device 17 receives a speech signal via the input terminal 19 to which allows the speech signal be recorded or reproduced. The reproduction operation of the recording/reproduction device 17 is controlled by start and end addresses which are supplied from the speech segment detector 12. The start address indicates specific data which, after the start of detecting speech segments by the speech segment detector 12, is input to the speech segment detector 12 at a specific point in time corresponding to the real start point of the speech segment. In the example of FIG. 2, data D7, at the time t1 corresponding to the start point of the speech segment, is input to the speech segment detector 12 at the seventh time position, and, in this case, the value of the start address is "7". On the other hand, the end address indicates specific data which, after the start of detecting speech segments by the speech segment detector 12, is input to the speech segment detector at a specific point in time corresponding to the real end point of the speech segment. In the example of FIG. 2, data D17, at the time corresponding to the end point of the speech segment, is input to the speech segment detector 12 at the seventeenth time position and, in this case, the value of the end address is "17".

In this way, the reproducing operation of the recording/reproduction device 17 is controlled by the start and end addresses for defining the speech segment and, by so doing, the recording/reproduction device 17 reproduces only a speech signal belonging in the speech segment detected by the speech segment detector 12. If there occurs any detection error for the speech segment, the recording/reproduction device 17 reproduces only a speech signal belonging in that speech segment actually detected, enabling the occurrence of such a detection error in that speech segment to be informed transmitted to an operator.

Figure 3:
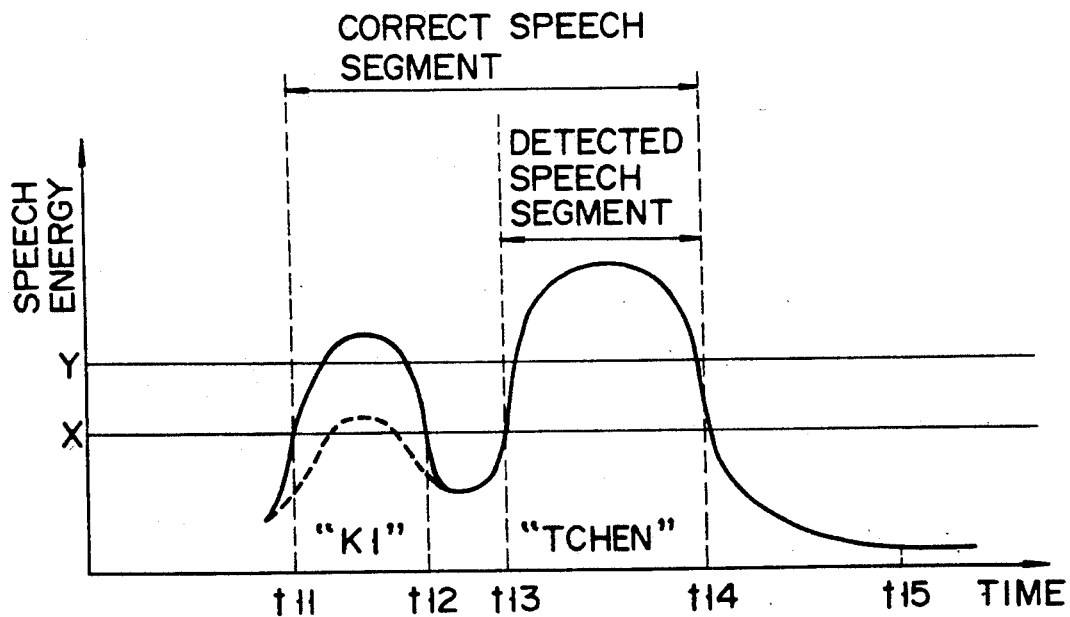
FIG. 3 is a graph for explaining an actual detection operation of the speech segment detector used in the speech recognition LSI system shown in FIG. 1.

Here, let it be assumed that the first syllable "KI" in the word "KITCHIN" is feebly uttered by the operator, and that only the data corresponding to the syllable "TCHEN" is detected. Thus, the data of the syllable "KI" is not detected as a speech segment. In this case, a data level of an energy channel corresponding to the "KI" falls as is indicated by the dotted line in FIG. 3. Instead of selecting the time t11 initially as a start point of that speech segment, the time t13 at which the data level corresponding to the syllable "TCHEN" initially exceeding the value X will be selected as the start point of the speech segment. As a result, the speech segment detected by the speech segment detector 12 will be that which ranges from the time t13 to the time t14.

In this case, the recording/reproduction device 17 reproduces only a speech signal recorded over the time period from the time t13 to the time t14. Hence, the speech portion corresponding to "TCHEN" is fed back to the operator. Since the operator can recognize the detection error in this detection segment, if he or she again utters the same word carefully, there is a higher probability that, the second time, the corresponding speech segment will be correctly detected.

Figure 4:
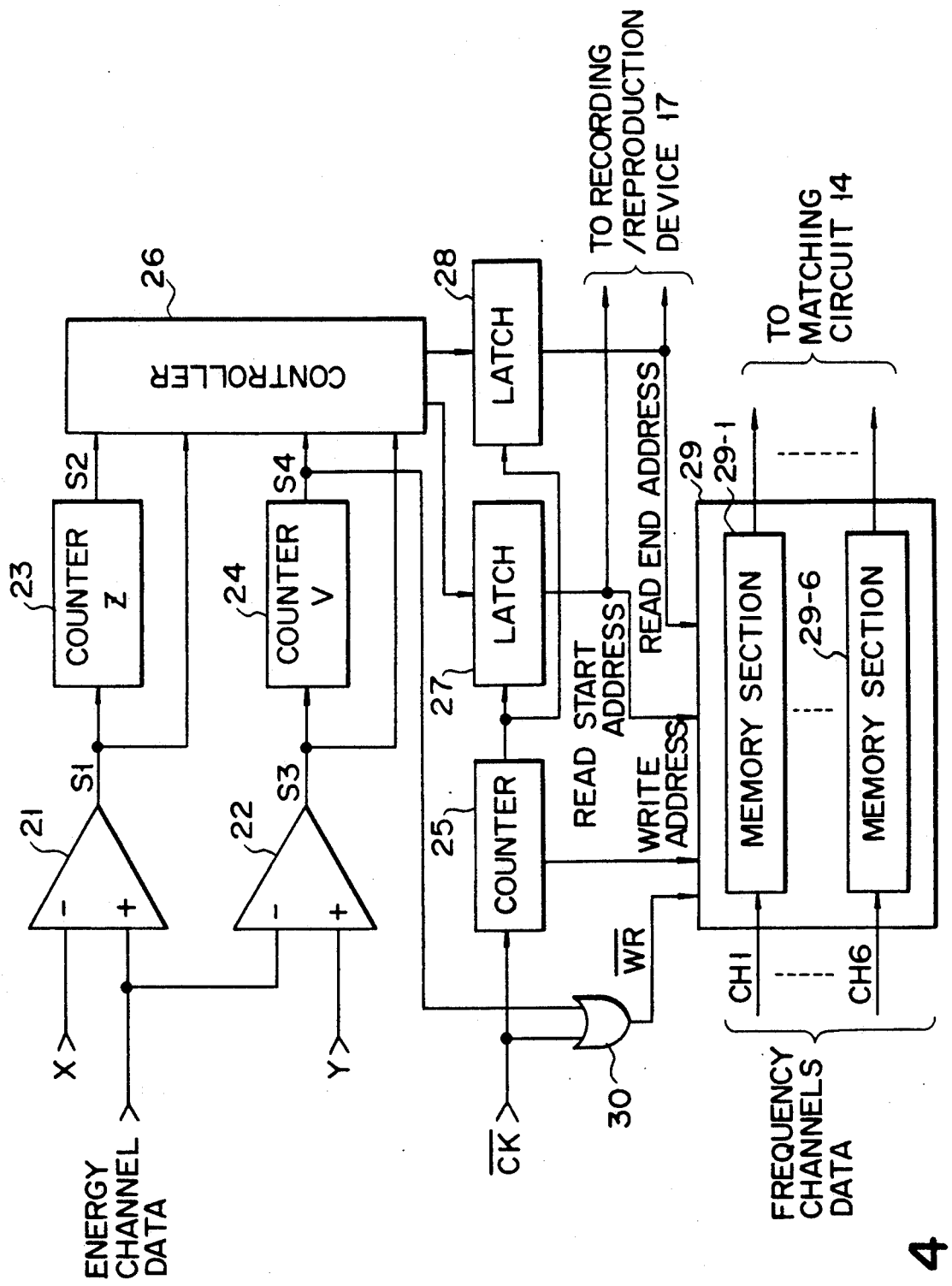
FIG. 4 is a block diagram showing one form of the speech segment detector used in the speech segment detector shown in FIG. 1.

FIG. 4 shows one form of a practical speech segment detector 12, shown in FIG. 1. The speech segment detector shown in FIG. 4 comprises comparators 21 and 22, counters 23, 24, and 25, controller 26, latch circuits 27, and 28, memory unit 29, and OR gate 30.

The comparator 21 receives a speech channel data and value X and generates a candidate start point detection signal S1 of a logic "1" level when it receives speech energy channel data higher in value than the value X. The counter 23 supplies a start point determination signal S2 of a "1" level to the controller 26 when it continuously receives a candidate start point detection signal of a logic "1" level over a time period Z. The comparator 22 receives the speech energy channel data and value Y and generates a candidate end point detection signal S3 of a logic "1" level when it receives speech energy channel data lower in value than the value Y. The counter 24 supplies a candidate end point determination signal S4 of a logic "1" level to the controller 26 when it continuously receives the candidate end point detection signal S3 of a logic "1" level over the period of time Z.

The counter 25 counts the number of clock pulses $\overline{CK}$ while frequency channel data is being supplied in synchronization with the clock pulses $\overline{CK}$ from the speech analyzer 11 to the speech segment detector 12. The count value is supplied to the latch circuits 27 and 28, and also to the memory unit 29 as a write address.

The controller 26 latches the count value of the counter 25 to the latch circuit 27 each time it receives the candidate start point detection signal S1. The controller 26 reads out, upon receipt of the start point determination signal S2 of a logic "1" level, the latched value of the latch circuit 27 at that time and transmits it from the latch circuit 27 to the memory unit 29 as a read start address. Furthermore, the controller 26 latches, upon each receipt of a candidate end point detection signal S3 of a logic "1" level, a count value of the counter 25 at that time to the latch circuit 28. Upon receipt of a final point determination signal S4 of the "1" level, the controller 26 transmits the value latched by the latch circuit 28, as a read end address, from the latch circuit 28 to the memory unit 29.

The OR gate 30 generates a write enabling signal $\overline{WR}$ in accordance with a clock pulse signal $\overline{CK}$ and the end point determination signal S4 of the counter 24. That is, with the end point determination signal of the "1" level not delivered from the counter 24, a write enable signal $\overline{WR}$ with a "0" level is generated in synchronization with the clock pulse signal $\overline{CK}$ so that a write mode may be set. With the end point determination signal S4 of the "1" level delivered from the counter 24, the OR gate 30 generates a write enable signal WR of the "1" level, irrespective of the clock pulse $\overline{CK}$, in order to set up the read mode.

The memory unit 29 includes six memory sections 29-1 to 29-6 which correspond to six frequency channels CH1 to CH6 delivered as respective data from the speech analyzer 11. In the write mode, addresses are counted in accordance with the number of occurrences of the clock pulse signals $\overline{CK}$ and the data of the frequency channels CH1 to CH6 are sequentially written into the memory sections 29-1 to 29-6. In the read mode, on the other hand, the data items in an address range which is designated by the read start address and the read end address from the latch circuits 27 and 28 are respectively read out from the memory sections 29-1 to 29-6. Here the read start address and the read end address correspond to the start and end points of the speech segment, and the data read out of the memory sections 29-1 to 29-6 are only data items belonging in the speech segment.

Figure 5:
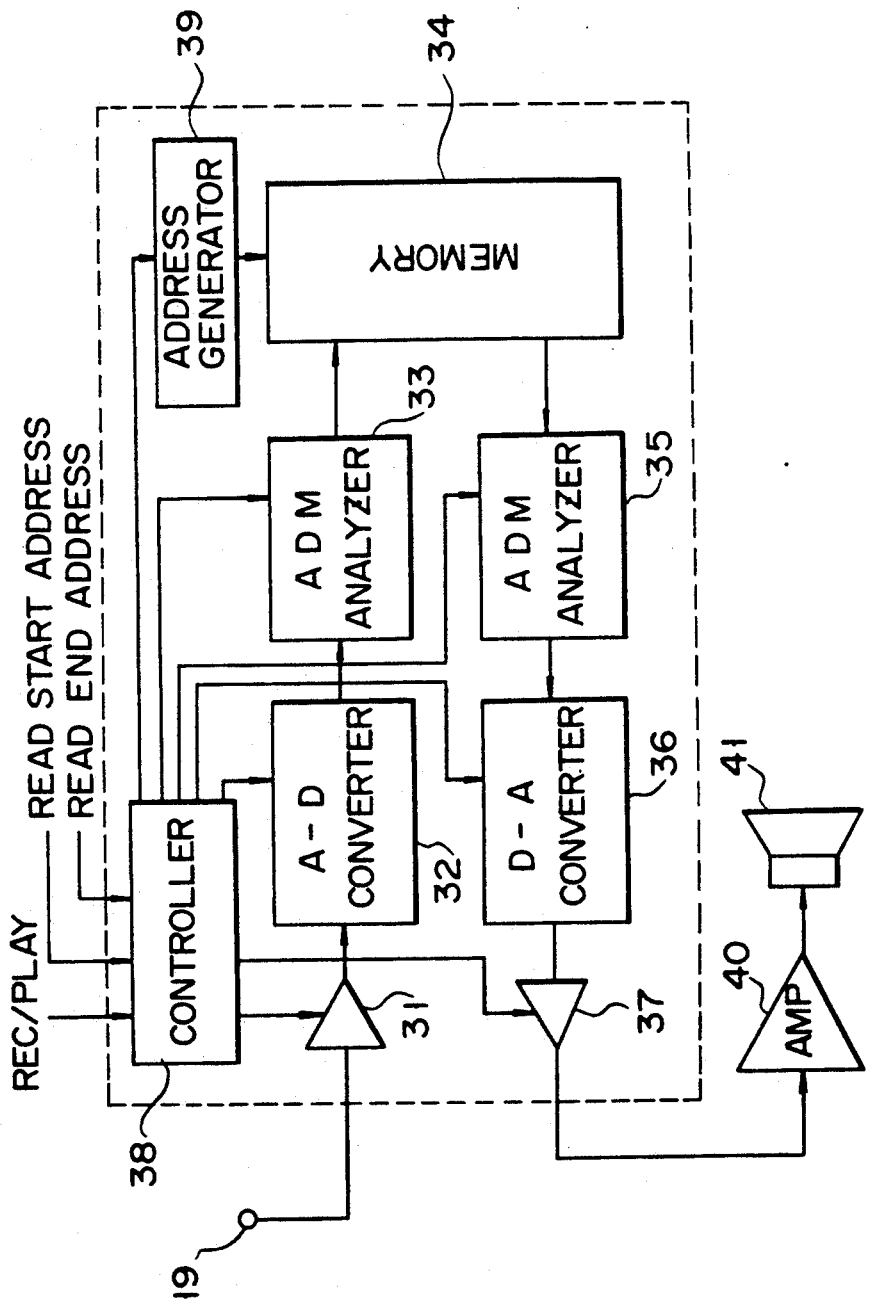
FIG. 5 is a block diagram showing one form of the recording/reproduction device used in the speech recognition LSI system shown in FIG. 1.

FIG. 5 shows one form of a recording/reproduction device 17, shown in FIG. 1. The recording/reproduction device 17, as shown in FIG. 5, includes an input buffer 31, an A-D converter 32, an ADM adaptive delta modulation analyzer, 33 for data compression, a memory 34, an ADM analyzer 35 for data expansion, a D-A converter 36, an output buffer 37, a controller 38, an address generator 39, an amplifier 40 and a speaker 41. The input buffer 31, A-D converter 32, ADM analyzer 33, memory 34, ADM analyzer 35, D-A converter 36, output buffer 37, controller 38, and address generator 39 are all built up on one LSI chip, and the amplifier 40 and speaker 41 are provided outside the LSI chip.

The controller 38 controls the operation of the recording/reproduction device 17 in accordance with a recording/reproduction switching signal REC/PLAY input externally from the circuit. In the recording mode, the controller 38 sets the input buffer 31, A-D converter 32, and ADM analyzer 33 in an active state and enables the address generator 39 to generate a serial address. In the reproduction mode, on the other hand, the controller 38 controls the address generator 39 to enable the ADM analyzer 35, D-A converter 36 and output buffer 37 to be placed in an active state and to control the address generator 39 so that only data corresponding to an address range designated by the read start and read end address input to the controller 38 from the speech segment detector 12 is read out of the memory 34.

In the recording mode, an analog signal from an input terminal 19 is supplied via an input buffer 31 to the A-D converter 32 where it is converted to a digital signal. The output of the A-D converter 32 is compressed by the ADM analyzer 33 and is written into the memory 34. Of those data items written into the memory 34, only that data belonging in the address range designated by the read start and read end address is read out of the memory 34 in the reproduction mode. The data thus read is expanded by the ADM analyzer 35 and is converted by the D-A converter 36 to an analog signal. The output of the D-A converter 36 is delivered via the output buffer 37 and amplifier 40 to the speaker 41 where it is reproduced as a speech signal. The reproduced speech signal corresponds only to the speech belonging in the speech segment actually detected by the speech segment detector 12.

A speech recognition LSI system according to a second embodiment of the present invention will be explained below with respect to FIG. 6. The second embodiment shown is similar to the first embodiment shown in FIG. 1 except that the speech segment detector 12 is provided preceding the speech analyzer 11.

In the second embodiment, the speech segment detector 12 detects a speech segment from an analog speech signal supplied from an input terminal 19 and supplies the speech segment to the speech analyzer 11. Also in the second embodiment, it is only the speech segment detected by the speech segment detector 12 that the recording/reproduction device 17 reproduces. Hence, the operator can hear the speech segment actually detected as in the first embodiment.

Figure 7:
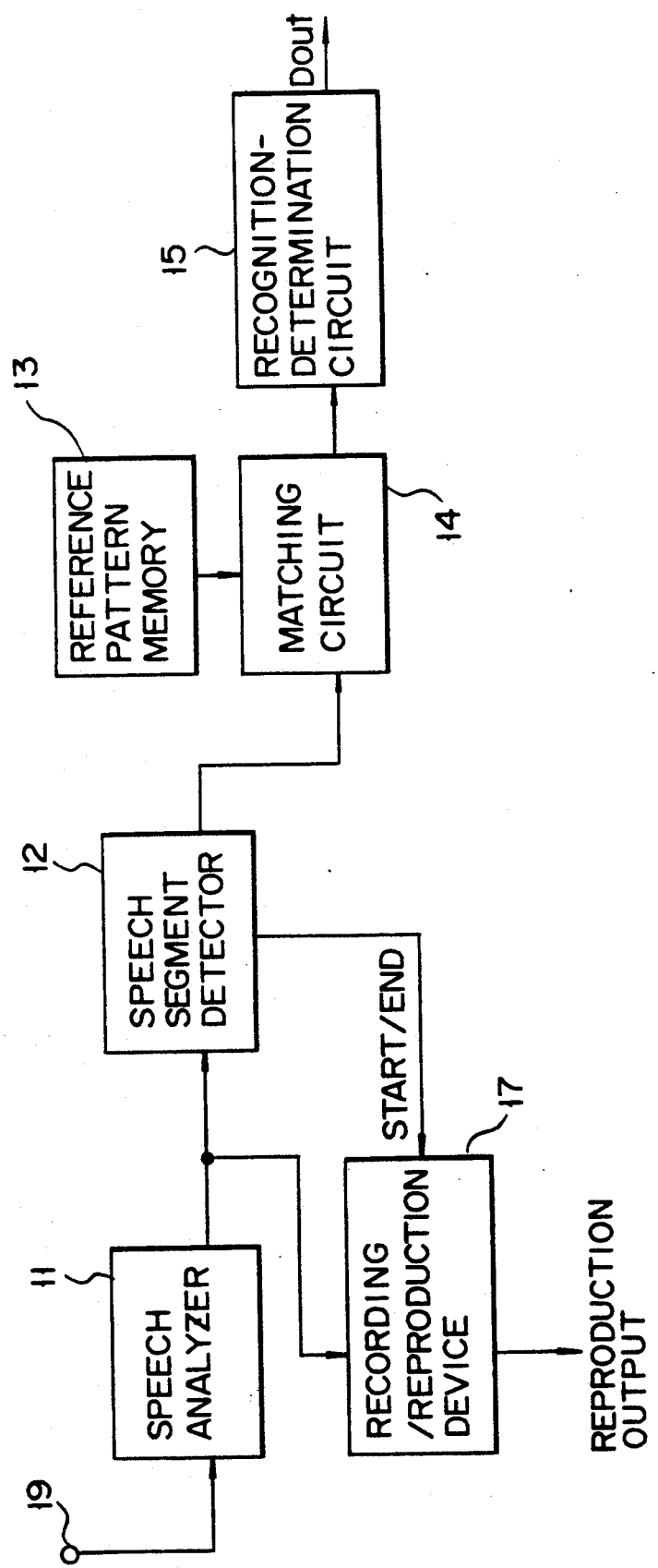
FIG. 7 is a block diagram showing a speech recognition LSI system according to a third embodiment of the present invention.

FIG. 7 shows a speech recognition LSI system according to a third embodiment of the present invention. The third embodiment is similar to the first embodiment, except that the recording/reproduction device 17 records a digital signal output from the speech analyzer 11, not the analog speech signal supplied from an input terminal 19. In the third embodiment shown in FIG. 7, the recording/reproduction device 17 reproduces only the speech segment the speech detector 12 has actually detected.

FIG. 8 shows a speech recognition LSI system according to a fourth embodiment of the present invention. In the fourth embodiment, the speech segment detector 12 is provided preceding the speech analyzer 11, as in the second embodiment, shown in FIG. 6, and a speech signal, input to a recording/reproduction device 17, is a digital speech signal supplied from the speech analyzer 11, as in the third embodiment, shown in FIG. 7.

Figure 9:
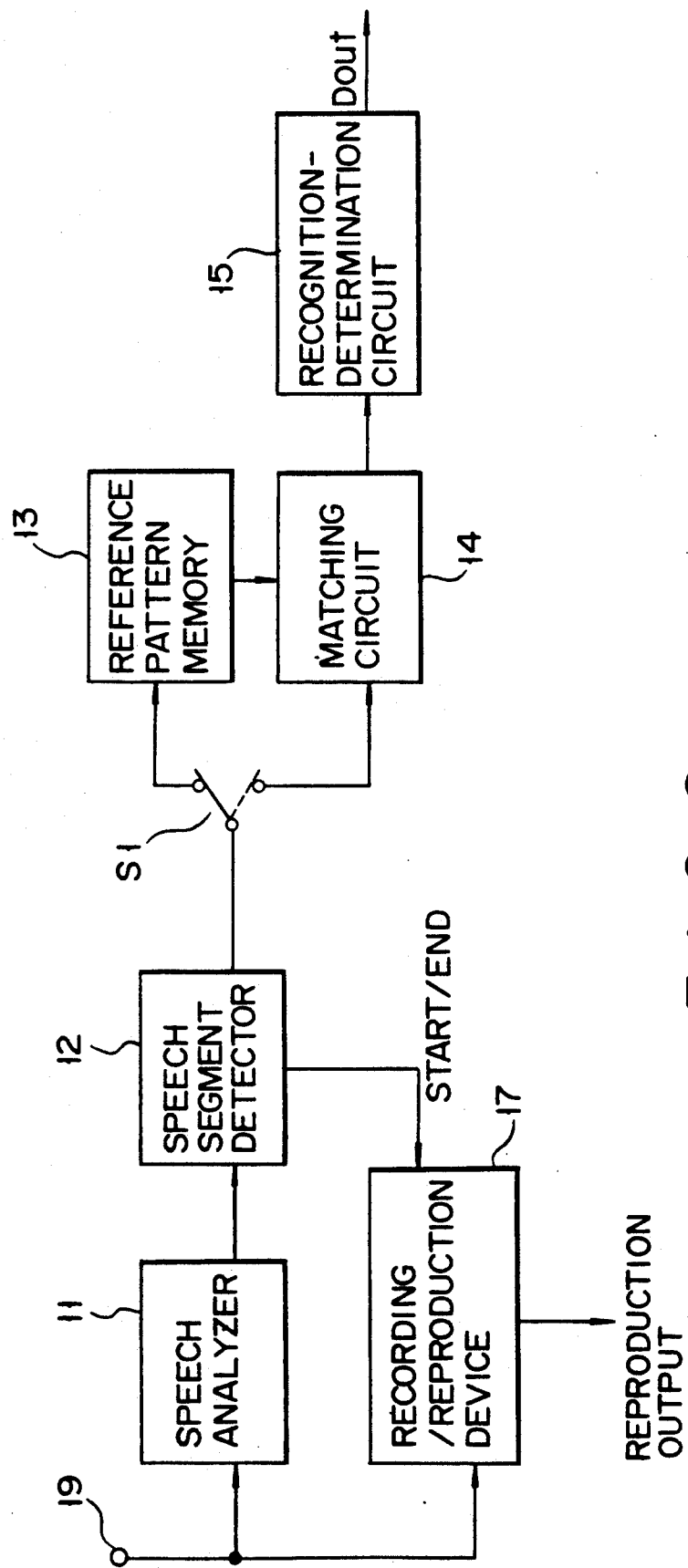
FIG. 9 is a block diagram showing a modification of the speech recognition LSI system shown in FIG. 1.

FIG. 9 shows a modification of the first embodiment. The LSI system as shown in FIG. 9 includes a switch S1 for switching between a speech recognition mode and a speech registration mode.

When the switch S1 is connected to the reference pattern memory 13, as indicated by a solid line in FIG. 9, the speech recognition LSI system is set to a speech registration mode and, in the speech registration mode, six frequency channel data which is output from the speech segment detector 12 is registered in the reference pattern memory 13 as a reference pattern corresponding to one word. In the speech registration mode, an operator can understand which words have been registered in the reference pattern memory 13 correctly, and which words have been registered in the reference pattern memory 13 incorrectly, by means of the recording/reproduction device 17. When, on the other hand, the switch S1 is connected to the matching circuit 14 as indicated by a broken line in FIG. 9, the speech recognition LSI system is set to a speech recognition mode and performs the aforementioned recognition operation as already set forth with respect to FIG. 1.

Figure 10:
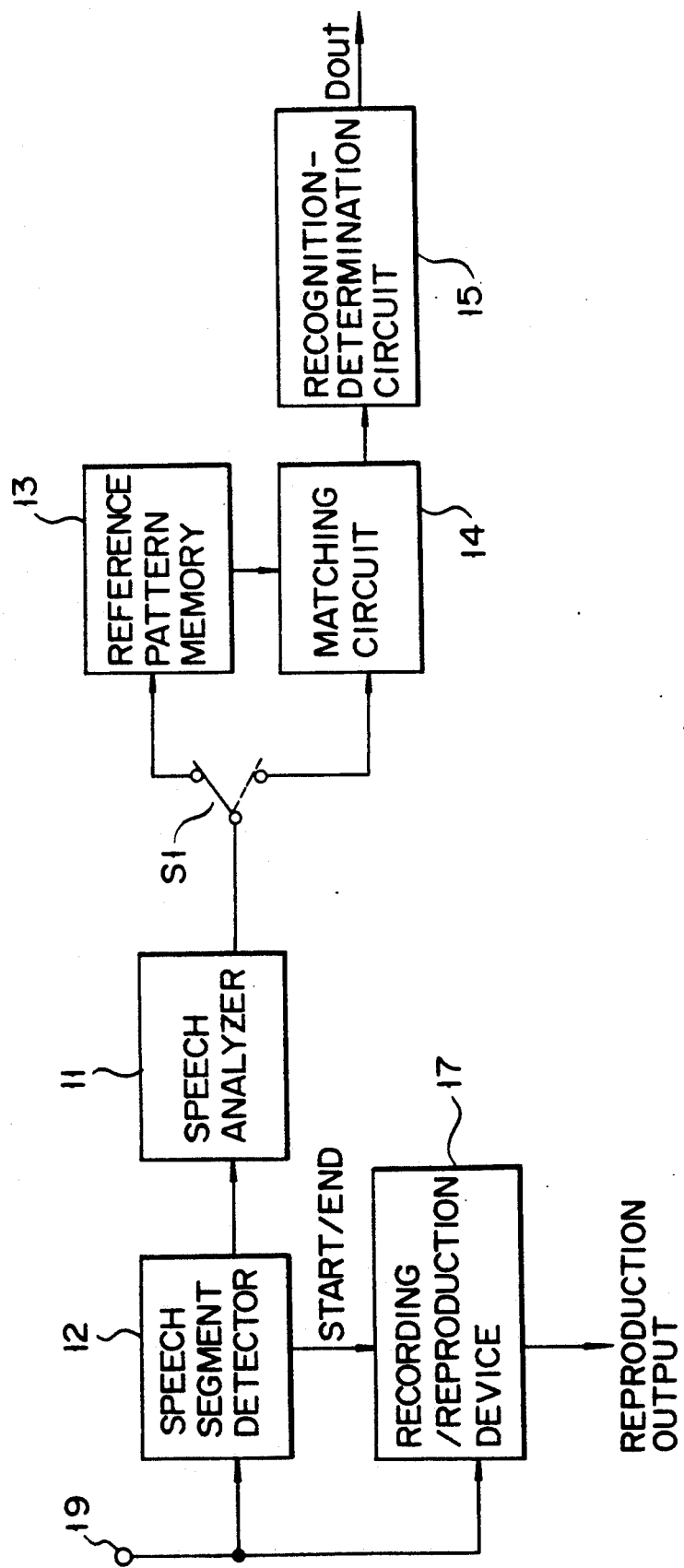
FIG. 10 is a block diagram showing a modified form of the speech recognition LSI system of the second embodiment of the invention, shown in FIG. 6.
Figure 11:
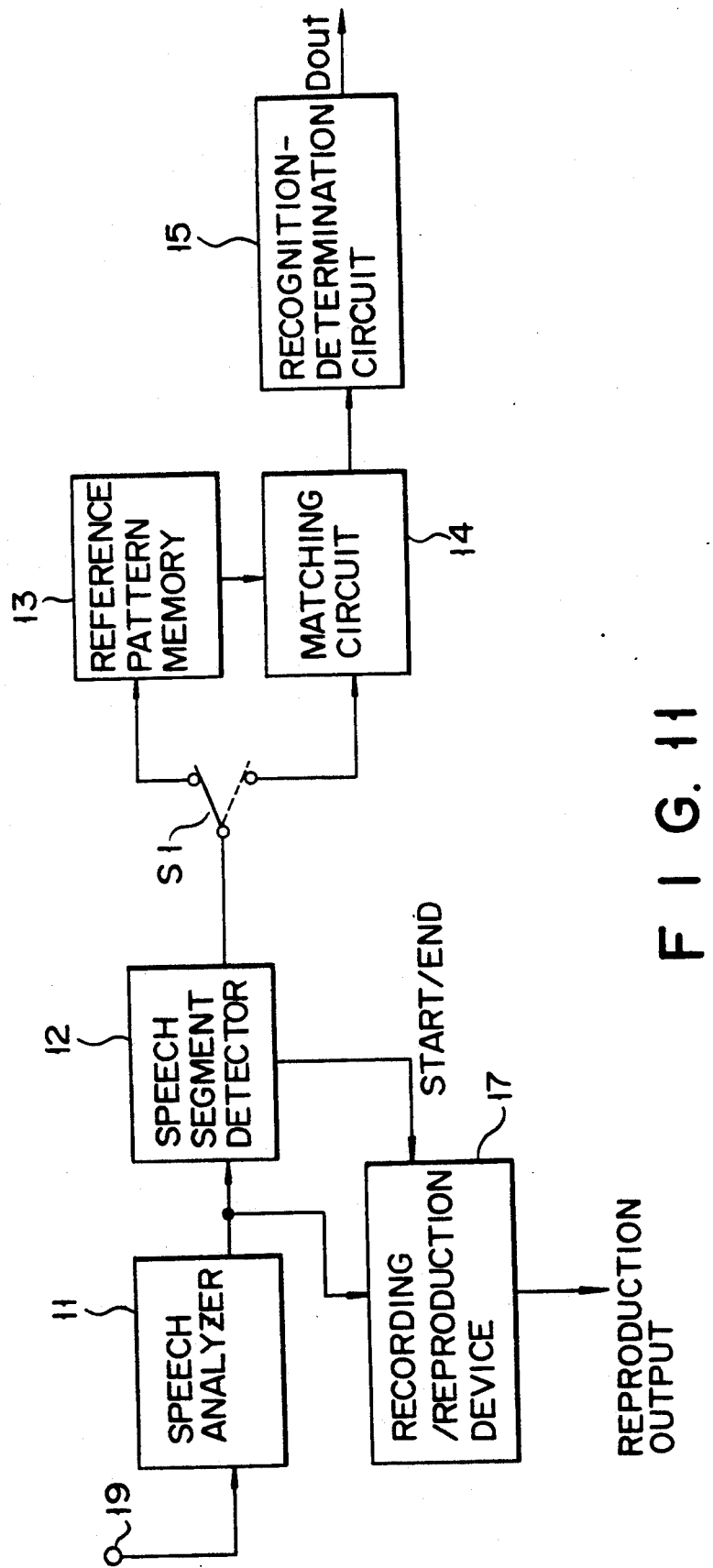
FIG. 11 is a block diagram showing a modification of the speech recognition LSI system of the third embodiment of the invention shown in FIG. 7.
Figure 12:
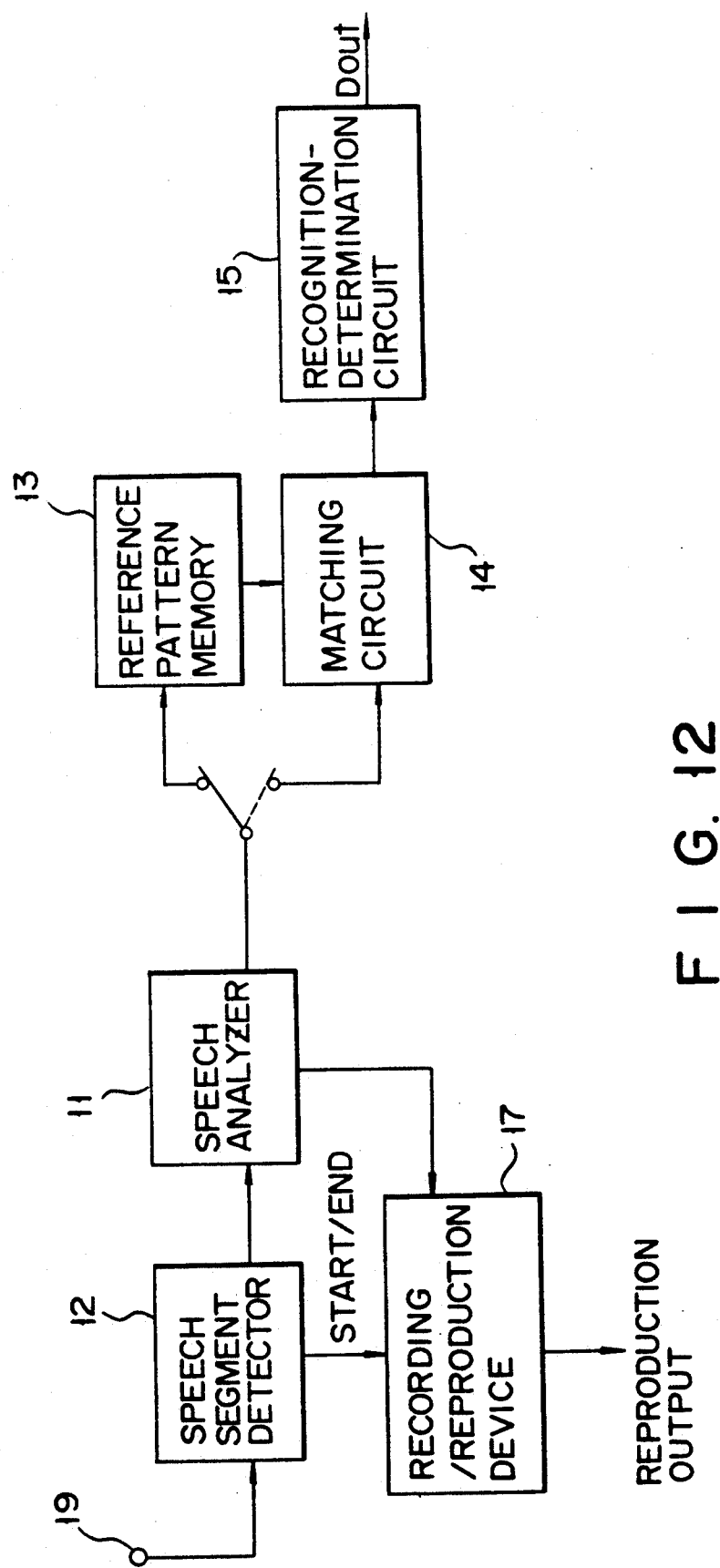
FIG. 12 is a block diagram showing a modification of the speech recognition LSI system of the fourth embodiment of the invention.

FIGS. 10, 11 and 12 show varied forms of a speech recognition LSI system. The respective variant include a switch S1 for making a switching between a speech recognition mode and a speech registration mode as in the system shown in FIG. 9.

As evident from the aforementioned explanation, in the speech recognition LSI system of the present invention, the recording/reproduction device 17 reproduces a speech segment detected by the speech segment detector 12. The speech segment detected by the speech segment detector 12 can be indicated to the operator, and the operator can know whether or not any speech segment has been detected. If the operator finds that a speech segment not detected, he or she again utters the word so that speech segments can be detected, and so that the speech can be recognized. The operator need not repeat the speech until the speech is correctly recognized.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A speech recognition LSI system comprising:
   speech segment detecting means for receiving a speech signal and for detecting a speech segment corresponding to one word from the speech signal on the basis of an input level thereof, the speech segment being a section of the speech signal which has a level higher than a predetermined value over a predetermined period of time, and for generating start and end signals which indicate start and end portions of the detected speech segment;
   reference pattern memory means for storing reference patterns corresponding to words;
   speech recognition means for comparing a portion of the received speech signal which is defined as the one word by said speech segment detecting means, with the reference patterns stored in said reference pattern memory means and for selecting the reference pattern most similar to the speech segment detected by said speech segment detecting means; and
   recording/reproduction means for recording the speech signal and for reproducing, in accordance with the start and end signals generated from said speech segment detecting means, only the portion of the received speech signal which is defined as the one word by said speech segment detecting means.

2. The system according to claim 1, wherein said speech signal is an analog signal.

3. The system according to claim 2, further comprising speech analyzing means, provided preceding said speech segment detecting means, for converting the analog signal to a digital speech signal in accordance with the frequency of the analog signal and for delivering the digital speech signal as an output signal.

4. The system according to claim 3, wherein said speech segment detecting means detects a speech segment from the digital speech signal.

5. The system according to claim 2, wherein said speech segment and detects a speech segment from the analog speech signal.

6. The system according to claim 5, further comprising a speech analyzing means, provided subsequent to said speech segment detecting means, for converting an analog speech signal to a digital speech signal in accordance with the frequency of the analog speech signal and for delivering the digital speech signal as an output signal.

7. The system according to claim 2, wherein said recording/reproduction means records said analog speech signal.

8. The system according to claim 3, wherein said recording/reproduction means receives and records a digital speech signal supplied from said speech analyzing means.

9. The system according to claim 6, wherein said recording/reproduction means receives and records the digital speech signal supplied from said speech analyzing means.

10. The system according to claim 1, further comprising switch means for switching the output of said speech segment detecting means to one of said reference pattern memory means and said speech recognition means.

11. The system according to claim 6, further comprising switch means for switching the output of said speech segment detecting means to one of said reference pattern memory means and said speech recognition means.

* * * * *